United States Patent
Stiver

(10) Patent No.: US 10,220,749 B2
(45) Date of Patent: Mar. 5, 2019

(54) CENTER CONSOLE WITH DUAL ROTATING COVERS

(71) Applicant: Honda Motor Co., Ltd., Tokyo (JP)

(72) Inventor: Brendan Christopher Stiver, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 15/427,836

(22) Filed: Feb. 8, 2017

(65) Prior Publication Data

US 2018/0222363 A1    Aug. 9, 2018

(51) Int. Cl.
*B60N 2/75* (2018.01)
*B60R 7/04* (2006.01)

(52) U.S. Cl.
CPC .............. *B60N 2/793* (2018.02); *B60R 7/04* (2013.01)

(58) Field of Classification Search
CPC .......... B60N 2/793; B60N 2/4686; B60R 7/04
See application file for complete search history.

(56) References Cited

U.S. PATENT DOCUMENTS

| 5,505,516 A | 4/1996 | Spykerman et al. |
| 7,520,552 B2 | 4/2009 | Nakamura et al. |
| 8,925,989 B2 | 1/2015 | Appelboum et al. |
| 2006/0071497 A1* | 4/2006 | Radu ..................... B60N 3/102 296/24.34 |

FOREIGN PATENT DOCUMENTS

| DE | 102008018558 A1 | 10/2009 |
| JP | 2002362237 A | 12/2002 |
| WO | 2015055319 A1 | 4/2015 |

* cited by examiner

*Primary Examiner* — D Glenn Dayoan
*Assistant Examiner* — Melissa A Black
(74) *Attorney, Agent, or Firm* — Honda Patents & Technologies North America, LLC; Mark E. Duell

(57) ABSTRACT

A center console for a vehicle includes a base, a storage compartment disposed within the base having an upwardly facing opening, and a cover hingedly connected to the base for selectively covering the opening of the storage compartment. The cover includes a first cover portion, a second cover portion, two rods positioned between the first cover portion and the second cover portion, and two reversible sections disposed around the rods. The reversible sections are axially rotatable about the rods between a first position and a second position. When in the first position, the reversible sections present an armrest, and in the second position, the reversible sections present a storage tray.

17 Claims, 7 Drawing Sheets

US 10,220,749 B2

CENTER CONSOLE WITH DUAL ROTATING COVERS

TECHNICAL FIELD

The embodiment disclosed herein related to the field of center consoles between seats in a vehicle.

BACKGROUND

Industry trends are to apply center consoles to motor vehicles with armrests and storage trays that slide and rotate in almost every direction. These sliding trays can be susceptible to damage, debris, and dirt. Therefore, there is a need for an improved center console that allows the vehicle user to choose between using the center console as an armrest or a tray for storage.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a center console for a vehicle includes a base, a storage compartment disposed within the base having an upwardly facing opening, and a cover hingedly connected to the base for selectively covering the opening of the storage compartment. The cover includes a first cover portion, a second cover portion, a first rod positioned between the first cover portion and the second cover portion, the first rod having a first end seated in the first cover portion and a second end seated in the second cover portion, and a first reversible section disposed around the first rod, the first reversible section axially rotatable about the first rod between a first position and a second position.

According to another aspect, a method of converting a center console with a storage container having a convertible cover includes the steps of opening the convertible cover, rotating a first reversible section disposed around a first rod between a first cover portion and second cover portion of the convertible cover, the first reversible section axially rotatable about the first rod between a first position and a second position.

According to yet another aspect, a center console for a vehicle includes a base, a storage compartment disposed within the base having an upwardly facing opening, and a cover hingedly connected to the base for selectively covering the opening of the storage compartment. The cover includes a first cover portion, a second cover portion, a first rod positioned between the first cover portion and the second cover portion, the first rod having a first end seated in the first cover portion and a second end seated in the second cover portion, a first reversible section disposed around the first rod, the first reversible section axially rotatable about the first rod between a first position and a second position, a second rod positioned between the first cover portion and the second cover portion and parallel to the first rod, the second rod having a first end seated in the first cover portion and a second end seated in the second cover portion, and a second reversible section disposed around the second rod, the second reversible section axially rotatable about the second rod between a first position and a second position.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
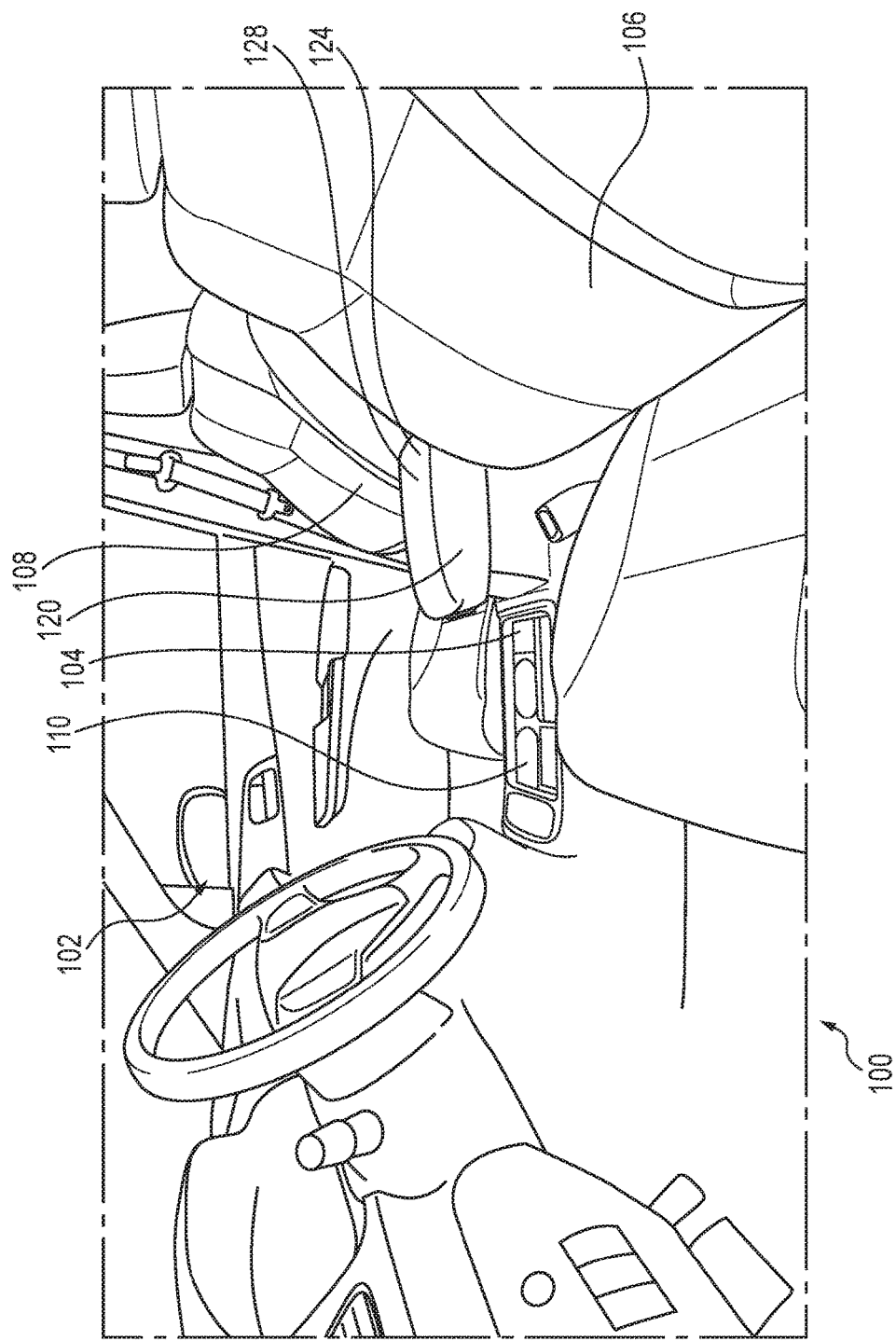
FIG. 1 is side view of the interior of a motor vehicle.
Figure 2:
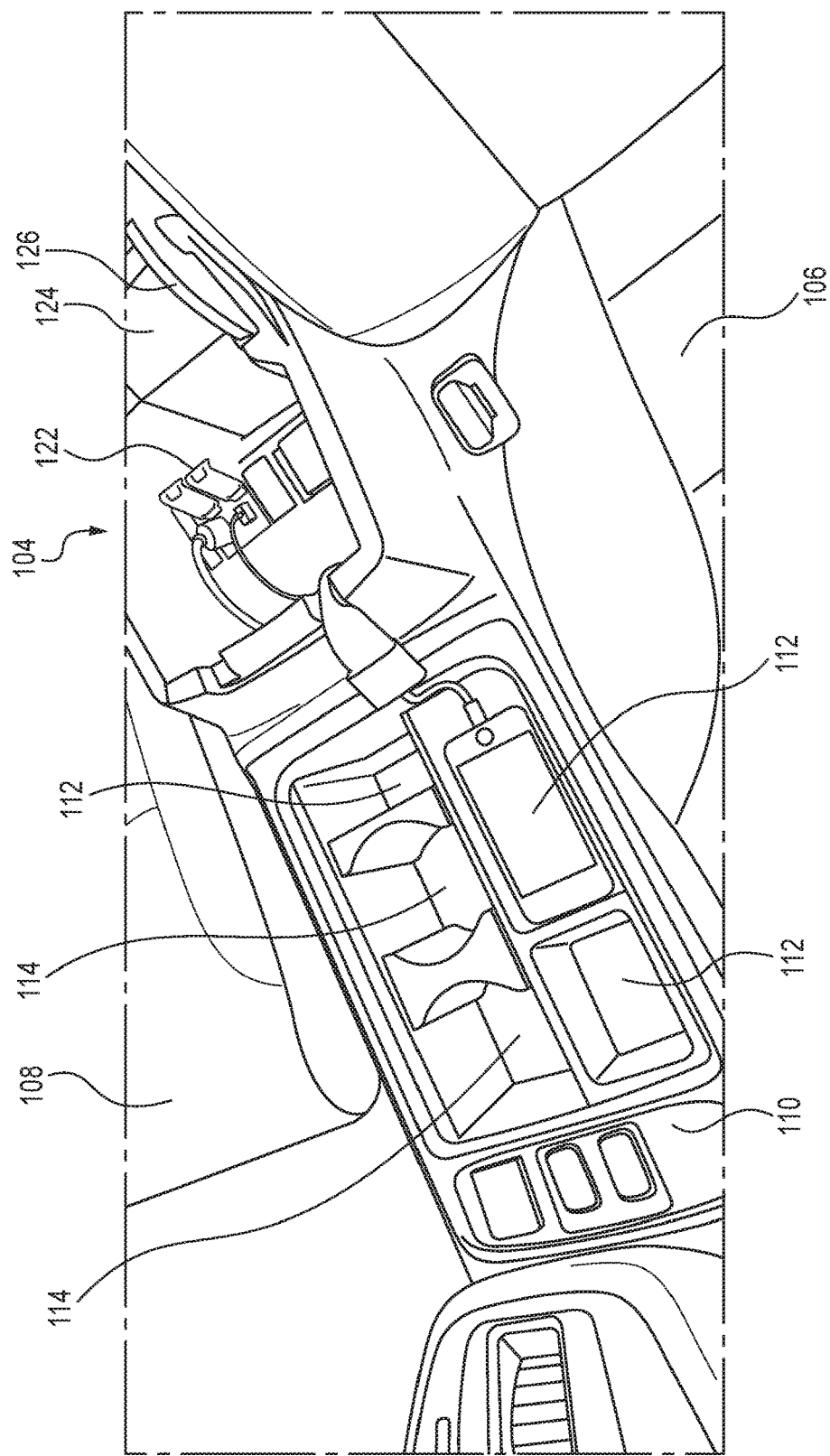
FIG. 2 is a perspective view of a center console of the motor vehicle.

FIGS. 1-2 illustrate an embodiment of a center console 104 positioned in the interior 102 of a motor vehicle 100 located between the front driver's seat 106 and the front passenger's seat 108. The center console 104 may include a forward portion 110 including small storage trays 112 and cup holders 114. Additionally, the center console may include a rearward portion 120 including a storage compartment 122 that is covered by a cover 124 connected to the center console 104 by a hinge 126 or any other suitable connection mechanism. In the illustrated embodiment, the cover 124, when in the closed position, includes an engagement surface 128 so that the cover 124 may function as an armrest.

FIGS. 3-7 illustrate one alternate embodiment of a center console 204. The center console 204 has a base 206, a forward portion 210 of which may include a small storage tray 212 and cup holders 214. A storage compartment 222 may be disposed in a rearward portion 220 of the base 206 that is covered by an improved cover 224 connected to the base 206 by a hinge 226.

Figure 6:
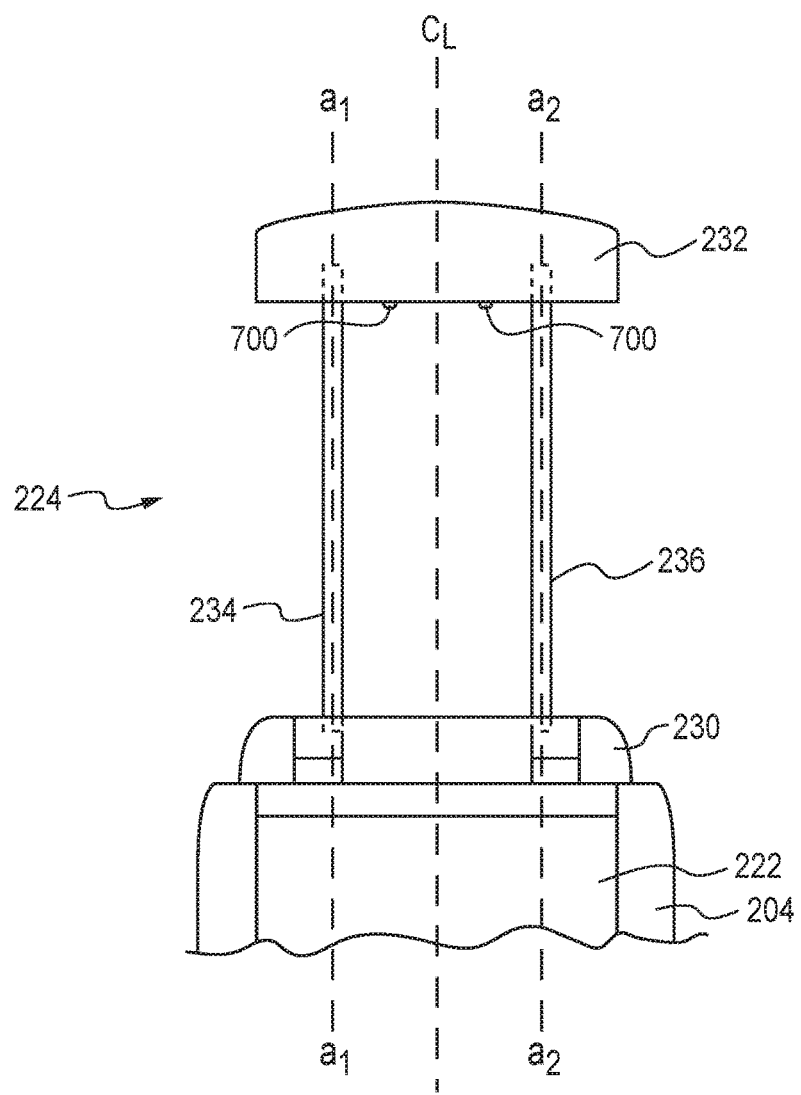
FIG. 6 is a bottom view of the cover of the center console without the reversible sections.

As illustrated in FIG. 6, the cover 224 may include a rear cover portion 230 and a forward cover portion 232. The rear cover portion 230 and forward cover portion 232 may be connected to two rods 234, 236 that span in parallel from the rear cover portion 230 to the forward cover portion 232. The rods 234, 236 are fixedly secured within the forward cover portion 232 and rear cover portion 230 by any suitable method known to one skilled in the art.

Figure 3:
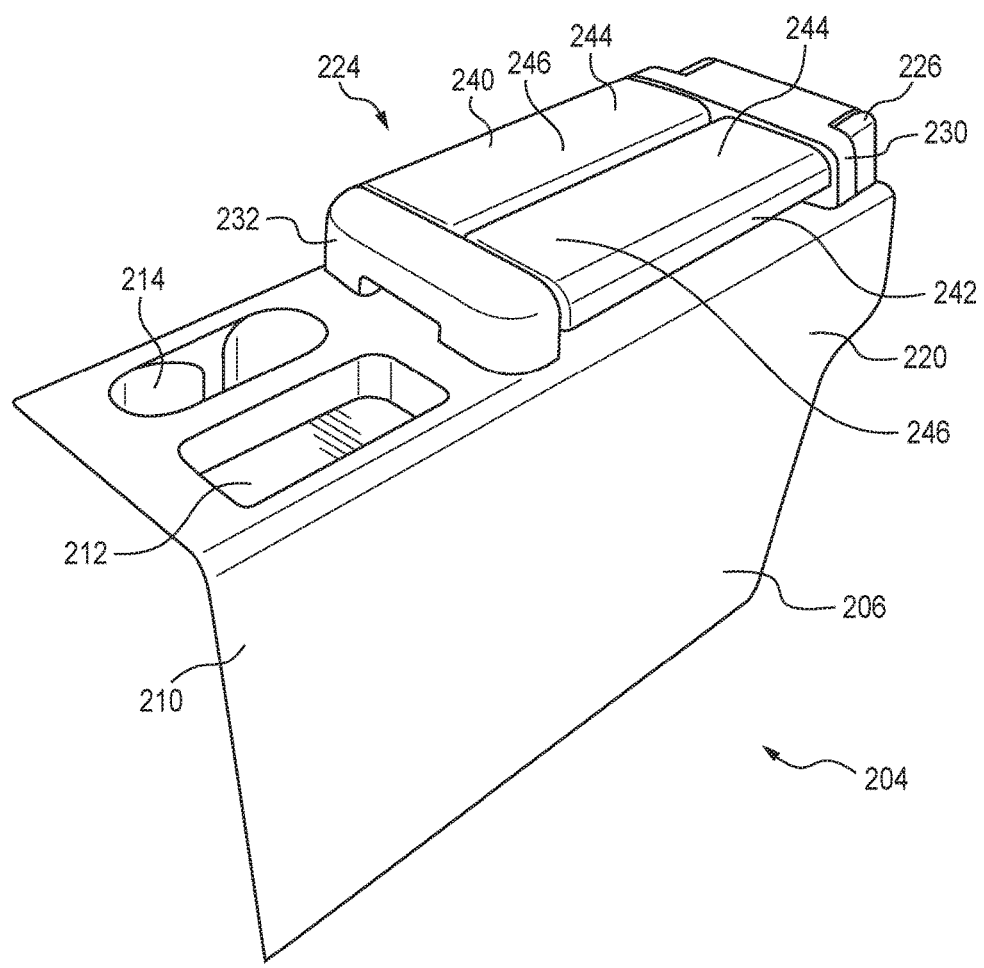
FIG. 3 is a perspective view of one embodiment of a center console with reversible sections of the cover in a first position.
Figure 7:
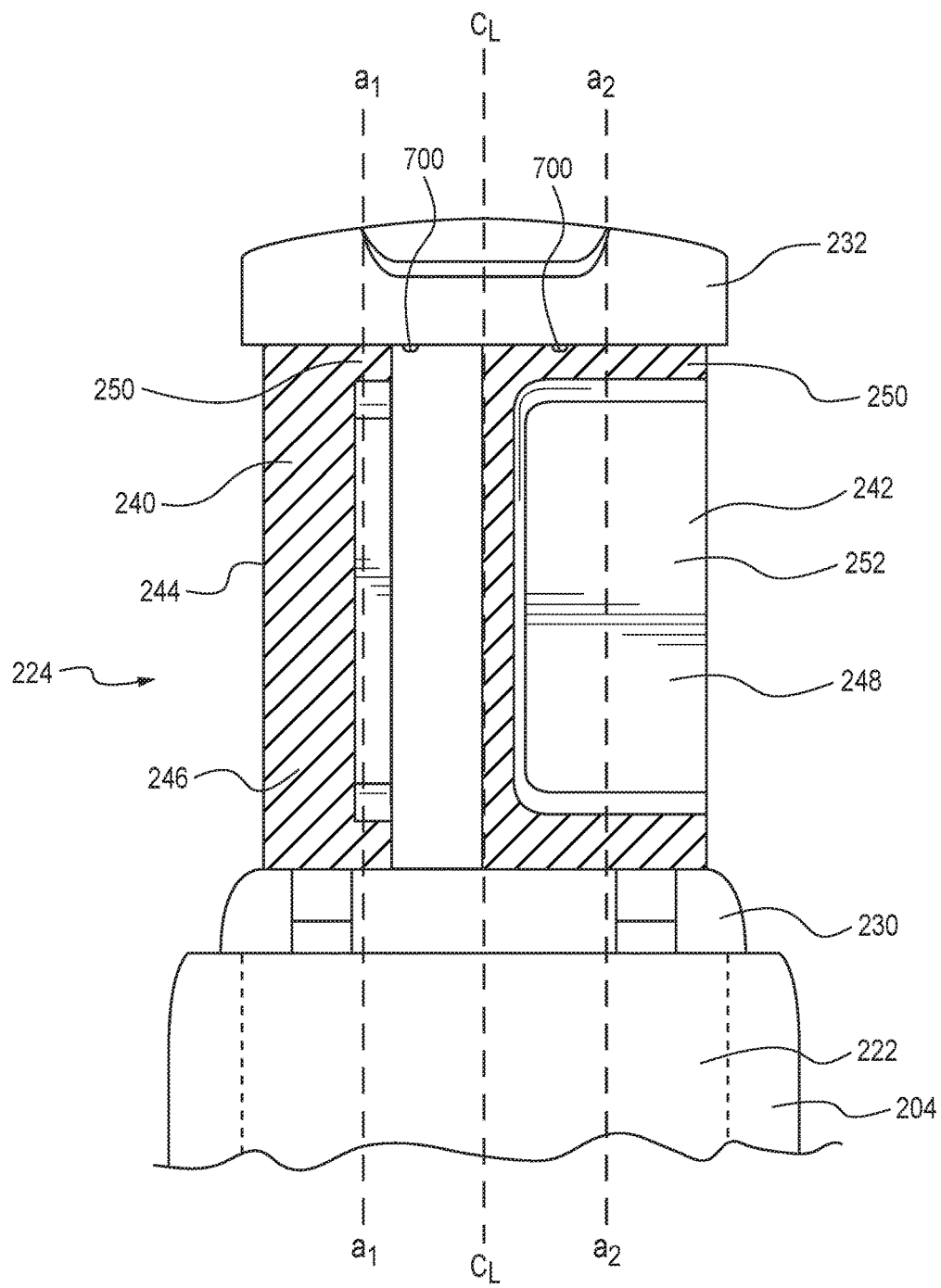
FIG. 7 is a bottom view of the cover of the center console with the reversible sections.

As illustrated in FIG. 7, the cover 224 may also include two reversible sections 240, 242. The reversible sections 240, 242 each include a first side 244 with a user engagement surface 246 that may be used as an armrest as illustrated in FIG. 3. The user engagement surface 246 may be constructed of any material used for automobile interiors, such a leather, vinyl, or any other suitable material. The user engagement surface 246 may also be padded in a conventional manner known to those skilled in the art to improve customer satisfaction when the user engagement surface 246 as an armrest.

The obverse second side 248 of each of the reversible sections 240, 242 may include an outer wall 250 and a recessed inner flat surface 252. The outer wall 250 may by U-shaped, surrounding three sides of the inner flat surface 252. The inner flat surface 252 is, as stated, flat and constructed of a hard material, such as a wood, metal, or a plastic or plastic polymer, in order that the inner flat surface may be used as a tray.

The reversible sections 240, 242 are disposed such that the rods 234, 236 are inserted through the reversible sections 240, 242 respectively. The reversible sections 240, 242 are free to rotate 180° about axes $a_1$ and $a_2$ through rods 234, 236 as shown.

FIG. 3 illustrates each of the reversible sections 240, 242 in a first position with the first side 244 of each reversible section 240, 242 facing upward or exposed to a user. When in the first position, the reversible sections 240, 242 are used as an armrest.

Figure 4:
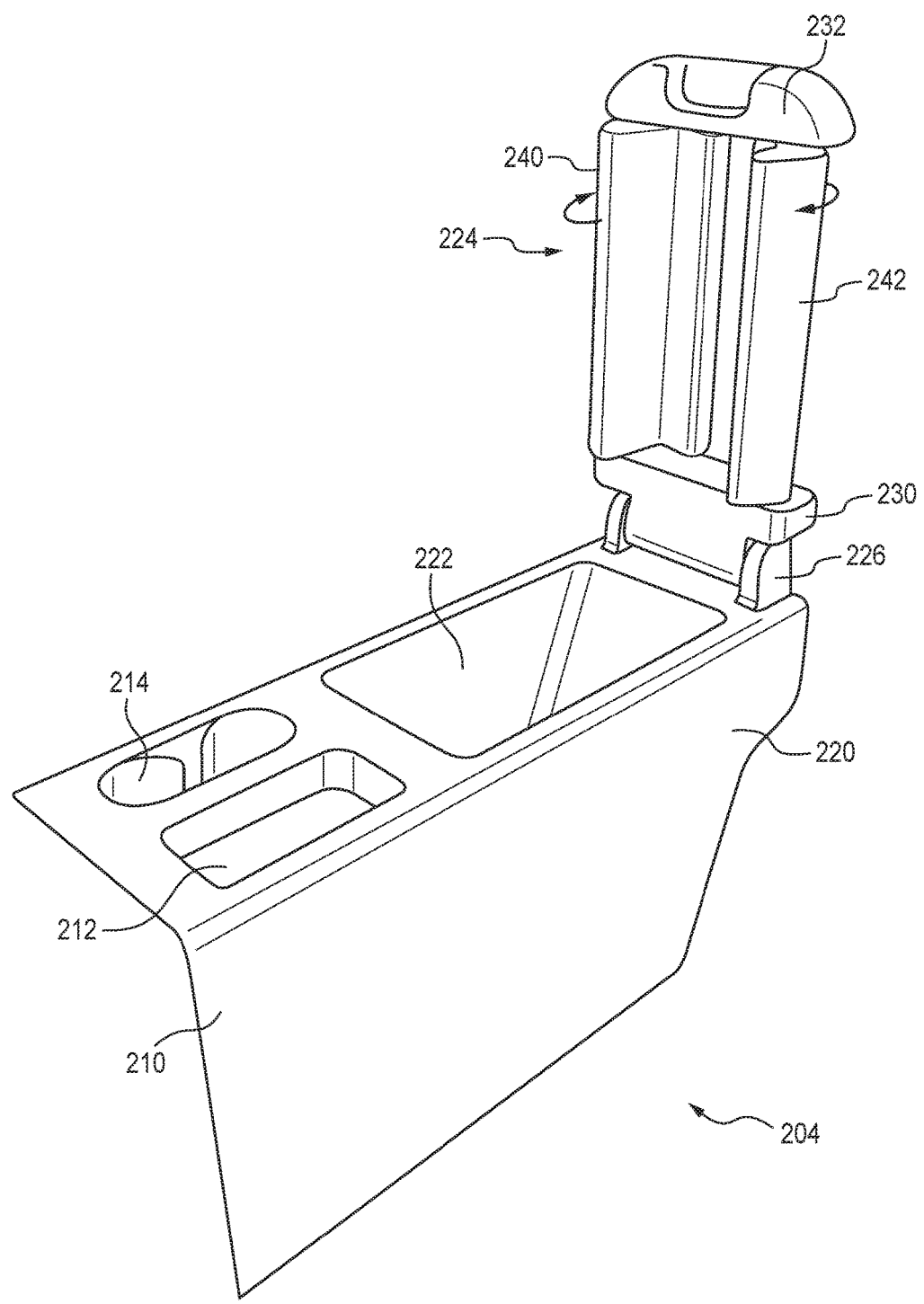
FIG. 4 is a perspective view of the embodiment of the center console with reversible sections rotating from the first position to a second position.

FIG. 4 illustrates each of the reversible sections 240, 242 rotating, each in a direction away from a longitudinal center line CL drawn through the center of the cover, about 90° about axes $a_1$ and $a_2$ when changing from the first position to the second position. In order to move from the second position to the first position, the rotation is reversed.

Figure 5:
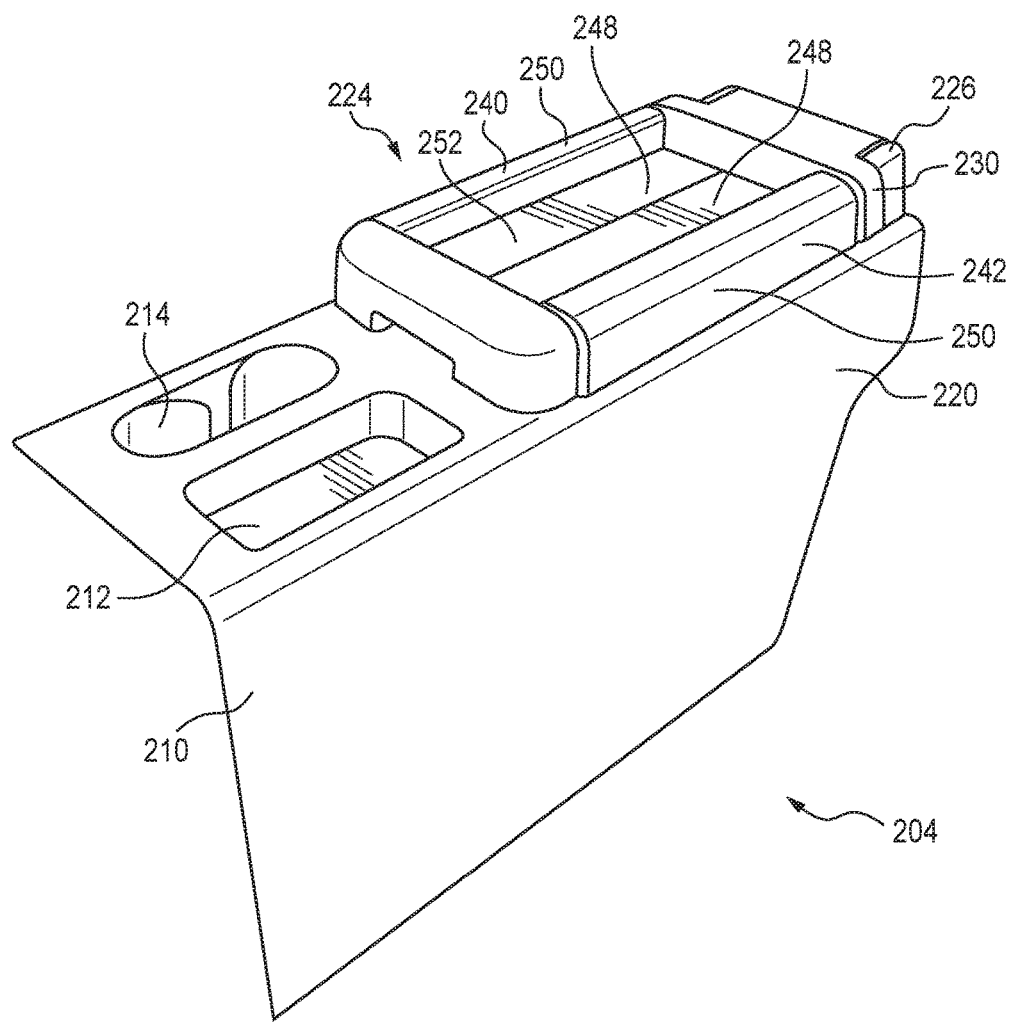
FIG. 5 is a perspective view of the embodiment of the center console with reversible sections of the cover in the second position.

FIG. 5 illustrates each of the reversible sections 240, 242 in the second position, rotated 180° from the first position, with the second side 248 of each reversible section 240, 242 facing upward or exposed to a user. When in a second position, the reversible sections 240, 242 are used as a tray.

Detents 700, or any other methods known to those skilled in the art, may be used to prevent over-rotation or accidental rotation of the reversible sections 240, 242 from either the first position or second position. As shown in FIG. 7, the detent 700 may be a small spring-loaded bearing that holds each of the reversible sections 240, 242 in place. In an alternative embodiment not illustrated, the forward cover portion 232 may include pins that hold the reversible sections 240, 242, and the forward cover portion 232 may move longitudinally along the axes $a_1$ and $a_2$ to engage and disengage the pins.

In the event the driver of the vehicle 100 prefers an armrest and the passenger prefers a tray or vice versa, one of the reversible sections 240, 242 may be in the first position, and one may be in the second position.

In yet another alternate embodiment, the cover may be constructed of a single reversible section rotatable about a single rod, with an armrest on the first side, and a tray on the second side.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A center console for a vehicle, comprising:
a base;
a storage compartment disposed within the base having an upwardly facing opening; and
a cover hingedly connected to the base for selectively covering the opening of the storage compartment, the cover comprising:
a first cover portion;
a second cover portion;
a first rod positioned between the first cover portion and the second cover portion, the first rod having a first end seated in the first cover portion and a second end seated in the second cover portion; and
a first reversible section disposed around the first rod, the first reversible section axially rotatable about the first rod between a first position and a second position, the first reversible section comprising:
a first side exposed when the first reversible section, which defines a first armrest, is in the first position; and
a second side exposed when the first reversible section is in the second position.

2. The center console of claim 1 wherein the first armrest comprises:
a first user engagement surface; and
a first padding covered by the first user engagement surface.

3. The center console of claim 2 wherein the second side of the first reversible section defines a first tray.

4. The center console of claim 3 wherein the first tray comprises:
a first outer wall; and
a first inner recessed flat surface.

5. The center console of claim 4 wherein the cover further comprises:
a second rod positioned between the first cover portion and the second cover portion and parallel to the first rod, the second rod having a first end seated in the first cover portion and a second end seated in the second cover portion; and
a second reversible section disposed around the second rod, the second reversible section axially rotatable about the second rod between a first position and a second position.

6. The center console of claim 5 wherein the second reversible section comprises:
a first side exposed when the second reversible section is in the first position; and
a second side exposed when the second reversible section is in the second position.

7. The center console of claim 6 wherein the first side of the second reversible section defines a second armrest.

8. The center console of claim 7 wherein the second armrest comprises:
a second user engagement surface; and
a second padding covered by the second user engagement surface.

9. The center console of claim 8 wherein the second side of the first reversible section defines a second tray.

10. The center console of claim 9 wherein the second tray comprises:
a second outer wall; and
a second inner recessed flat surface.

11. The center console of claim 10 wherein the first inner recessed flat surface and the second inner recessed flat surface are substantially coplanar when the first reversible section is in the second position and the second reversible section is in the second position.

12. The center console of claim 1 wherein the first rod comprises:
a first detent to limit axial rotation of the first rod between the first position and the second position.

13. The center console of claim 5 wherein the second rod comprises:
a second detent to limit axial rotation of the second rod between the first position and the second position.

14. A method of converting a center console with a storage container having a convertible cover, comprising the steps of:
opening the convertible cover;
rotating a first reversible section disposed around a first rod between a first cover portion and second cover portion of the convertible cover, the first reversible section axially rotatable about the first rod between a first position and a second position; and
rotating a second reversible section disposed around a second rod between a first cover portion and second cover portion of the convertible cover, the second reversible section axially rotatable about the second rod between a first position and a second position.

15. A center console for a vehicle, comprising:
a base;
a storage compartment disposed within the base having an upwardly facing opening; and
a cover hingedly connected to the base for selectively covering the opening of the storage compartment, the cover comprising:
a first cover portion;
a second cover portion;
a first rod positioned between the first cover portion and the second cover portion, the first rod having a first end seated in the first cover portion and a second end seated in the second cover portion;
a first reversible section disposed around the first rod, the first reversible section axially rotatable about the first rod between a first position and a second position;
a second rod positioned between the first cover portion and the second cover portion and parallel to the first rod, the second rod having a first end seated in the first cover portion and a second end seated in the second cover portion; and
a second reversible section disposed around the second rod, the second reversible section axially rotatable about the second rod between a first position and a second position.

16. The center console of claim 15 wherein the first reversible section comprises a first side exposed when the first reversible section is in the first position and a second side exposed when the first reversible section is in the second position, and wherein the second reversible section comprises a first side exposed when the second reversible section is in the first position and a second side exposed when the second reversible section is in the second position.

17. The center console of claim 16 wherein the first side of the first reversible section defines a first armrest and the second side of the first reversible section defines a first tray, and wherein the first side of the second reversible section defines a second armrest and the second side of the second reversible section defines a second tray.

* * * * *